United States Patent
Dejneka et al.

(10) Patent No.: US 11,352,289 B2
(45) Date of Patent: *Jun. 7, 2022

(54) ION EXCHANGEABLE GLASS CONTAINING BORON AND PHOSPHOROUS

(71) Applicant: CORNING INCORPORATED, Corning, NY (US)

(72) Inventors: Matthew John Dejneka, Corning, NY (US); Sinue Gomez, Corning, NY (US); Timothy Michael Gross, Corning, NY (US); Xiaoju Guo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,279

(22) Filed: Aug. 3, 2020

(65) Prior Publication Data
US 2020/0361810 A1 Nov. 19, 2020

Related U.S. Application Data

(63) Continuation of application No. 15/715,803, filed on Sep. 26, 2017, now Pat. No. 10,745,315, which is a (Continued)

(51) Int. Cl.
*C03C 3/097* (2006.01)
*C03C 3/091* (2006.01)
*C03C 21/00* (2006.01)

(52) U.S. Cl.
CPC .............. *C03C 3/097* (2013.01); *C03C 3/091* (2013.01); *C03C 21/002* (2013.01); *Y10T 428/315* (2015.01)

(58) Field of Classification Search
None
See application file for complete search history.

(56) References Cited

U.S. PATENT DOCUMENTS 3,357,876 A 12/1967 Dale
3,433,611 A 3/1969 Saunders et al.
(Continued)

FOREIGN PATENT DOCUMENTS

CN 102971267 A 3/2013
JP 2012-148909 A 8/2012
(Continued)

OTHER PUBLICATIONS

Chinese Patent Application No. 201480059089.7, Office Action dated Jan. 4, 2021, 6 pages (English Translation Only); Chinese Patent Office.

(Continued)

*Primary Examiner* — David Sample
(74) *Attorney, Agent, or Firm* — Kevin M. Johnson (57) ABSTRACT

Ion exchangeable glasses containing $SiO_2$, $Al_2O_3$, $Na_2O$, MgO, $B_2O_3$, and $P_2O_5$ are provided. The compressive stresses of these ion exchanged glasses are greater than 900 megapascals (MPa) at a depth of 45 or 50 microns (μm) with some glasses exhibiting a compressive stress of at least 1 gigaPascals (GPa). The ion exchange rates of these glasses are much faster than those of other alkali aluminosilicate glasses and the ion exchanged glass is resistant damage to impact damage. A method of ion exchanging the glass is also provided.

17 Claims, 5 Drawing Sheets

Related U.S. Application Data continuation of application No. 14/467,614, filed on Aug. 25, 2014, now Pat. No. 9,815,733.

(60) Provisional application No. 61/871,471, filed on Aug. 29, 2013.

(56) References Cited

U.S. PATENT DOCUMENTS

| | | | |
|---|---|---|---|
| 8,394,515 | B2 | 3/2013 | Yagi et al. |
| 8,652,979 | B2 | 2/2014 | Murata |
| 9,815,733 | B2 | 11/2017 | Dejneka et al. |
| 10,000,410 | B2 | 6/2018 | Dejneka et al. |
| 10,745,315 | B2 * | 8/2020 | Dejneka ................ C03C 21/002 |
| 2010/0215993 | A1 | 8/2010 | Yagi et al. |
| 2011/0294648 | A1 | 12/2011 | Chapman et al. |
| 2012/0135226 | A1 | 5/2012 | Bookbinder et al. |
| 2012/0308827 | A1 | 12/2012 | Boek et al. |
| 2013/0288001 | A1 | 10/2013 | Murata et al. |
| 2014/0170380 | A1 | 6/2014 | Murata et al. |

FOREIGN PATENT DOCUMENTS

| | | |
|---|---|---|
| WO | 2011/149811 A1 | 12/2011 |
| WO | 2012/126394 A1 | 9/2012 |
| WO | 2013/027675 A1 | 2/2013 |

OTHER PUBLICATIONS

Ullman et al (edited by)., "Elasticity and Strength of Glass", translated by Wang Xicheng, et al., Academic Press, 1st edition, vol. 5, Mar. 1980, pp. 330-332.

Korean Patent Application No. 10-2016-7007765, Notice of Allowance dated May 12, 2021, 4 pages (2 pages of English Translation and 2 pages of Original Document), Korean Patent Office.

English Translation of CN201480059089.7 Office Action and Search Report dated Aug. 2, 2017; 8 pages.

International Search Report and Written Opinion of the International Searching Authority; PCT/US14/52804; dated Jan. 5, 2015; 10 pages; European Patent Office.

* cited by examiner

ION EXCHANGEABLE GLASS CONTAINING BORON AND PHOSPHOROUS

This application is a continuation of U.S. patent application Ser. No. 15/715,803 filed on Sep. 26, 2017, the content of which is relied upon and incorporated herein by reference in its entirety, which is a continuation of U.S. patent application Ser. No. 14/467,614 filed on Aug. 25, 2014, the content of which is relied upon and incorporated herein by reference in its entirety, and claims the benefit of priority under 35 U.S.C. § 119 of U.S. Provisional Application Ser. No. 61/871,471 filed on Aug. 29, 2013, the content of which is relied upon and incorporated herein by reference in its entirety.

BACKGROUND

The disclosure relates to an ion exchangeable glass with high rates of ion exchange. More particularly, the disclosure relates to an ion exchanged glass in which a surface compressive stress is achievable with reduced ion exchange times. Even more particularly, the disclosure relates to such glasses that, when ion exchanged, are resistant to surface damage.

Glasses are used in as protective covers for electronic displays and the like. As such, glasses that are used in these applications must be resistant to damage caused by impact.

SUMMARY

Ion exchangeable glasses containing $SiO_2$, $Al_2O_3$, $Na_2O$, MgO, $B_2O_3$, and $P_2O_5$ are provided. The compressive stresses of these ion exchanged glasses are greater than 900 megapascals (MPa) at a depth of 45 or 50 microns (μm) with some glasses exhibiting a compressive stress of at least 1 gigaPascals (GPa). The ion exchange rates of these glasses are much faster than other alkali aluminosilicate glasses. The ion exchanged glasses are resistant to damage caused by impact. A method of ion exchanging the glass is also provided.

Accordingly, one aspect of the disclosure is to provide a glass comprising $SiO_2$, $Al_2O_3$, $Na_2O$, at least one divalent metal oxide, $B_2O_3$, and $P_2O_5$, wherein $Al_2O_3$ (mol %)≥$B_2O_3$ (mol %)+$P_2O_5$ (mol %).

A second aspect of the disclosure is to provide an ion exchanged glass comprising $SiO_2$, $Al_2O_3$, $Na_2O$, at least one divalent metal oxide, $B_2O_3$, and $P_2O_5$, wherein $Al_2O_3$ (mol %)≥$B_2O_3$ (mol %)+$P_2O_5$ (mol %). The ion exchanged glass has a compressive layer having a compressive stress of at least about 900 MPa. The compressive layer extends from a surface of the glass to a depth of layer of at least about 45 μm.

A third aspect is to provide a method of ion exchanging a glass. The glass comprises $SiO_2$, $Al_2O_3$, $Na_2O$, at least one divalent metal oxide, $B_2O_3$, and $P_2O_5$, wherein $Al_2O_3$ (mol %)≥$B_2O_3$ (mol %)+$P_2O_5$ (mol %). The method includes providing an ion exchange bath comprising $KNO_3$. The ion exchange bath is at a temperature in a range from about 410° C. to 470° C. The method also includes ion exchanging a glass in the ion exchange bath for a time period of up to about four hours. The ion exchanged glass has a layer under a compressive stress of at least 900 MPa. The layer extends from a surface of the glass to a depth of layer of at least about 45 μm.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) are expressed in terms of $10^{-7}$/° C. and represent a value measured over a temperature range from about 20° C. to about 300° C., unless otherwise specified.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant.

Vickers crack initiation thresholds described herein are determined by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

Figure 1:
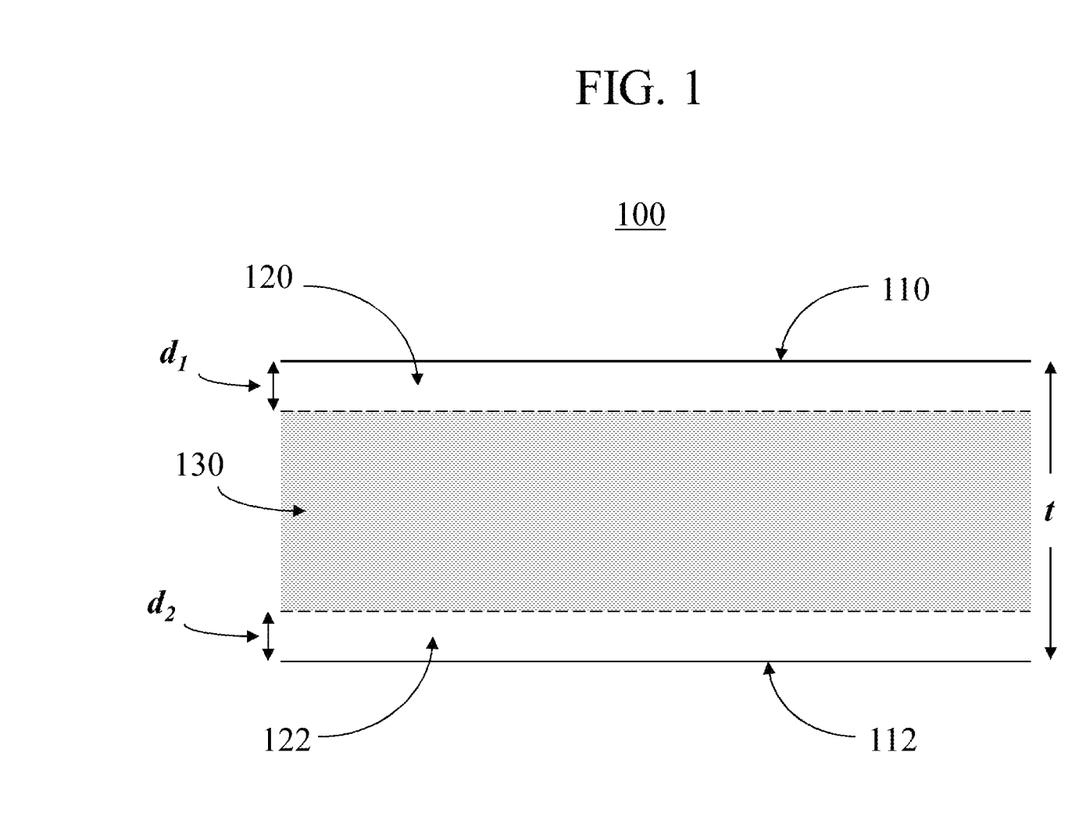
FIG. 1 is a schematic cross-sectional view of an ion exchanged glass.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses containing $SiO_2$, $Al_2O_3$, $Na_2O$, $MgO$, $B_2O_3$, and $P_2O_5$. All of these glasses are ion exchangeable. The compressive stresses of these ion exchanged glasses are greater than 900 megapascals (MPa) at a depth of 45 or 50 microns (μm) with some glasses exhibiting a compressive stress of at least 1 gigaPascals (GPa). The ion exchange rates of these glasses are much faster than other alkali aluminosilicate glasses. In addition, the diffusivities of some these glasses approximates the diffusivities of alkali aluminosilicate glasses that contain phosphorus.

The glasses described herein comprise $SiO_2$, $Al_2O_3$, $Na_2O$, at least one divalent oxide, $B_2O_3$, and $P_2O_5$, wherein the amount of alumina ($Al_2O_3$) present in the glass is greater than or equal to total amount of $B_2O_3$, and $P_2O_5$; i.e., $Al_2O_3$ (mol %)≥$B_2O_3$ (mol %)+$P_2O_5$ (mol %). In some embodiments, the glass consists essentially of or comprises: from about 54 mol % to about 71 mol % $SiO_2$ (i.e., 54 mol %≤$SiO_2$≤72 mol %); from about 9 mol % to about 18 mol % $Al_2O_3$ (i.e., 9 mol %≤$Al_2O_3$≤18 mol %); from about 9 mol % to about 18 mol % $Na_2O$ (i.e., 9 mol %≤$Na_2O$≤18 mol %); at least one of MgO, CaO, ZnO, BaO, and SrO, wherein 0.5 mol %≤MgO (mol %)+CaO (mol %)+ZnO (mol %)+BaO (mol %)+SrO (mol %)≤4 mol %; from about 0.5 mol % to about 11 mol % $B_2O_3$ (i.e., 4 mol %≤$B_2O_3$≤11 mol %); and from about 0.5 mol % to about 11 mol % $P_2O_5$ (i.e., 0.5 mol %≤$P_2O_5$≤11 mol %), wherein 4 mol %≤$B_2O_3$+$P_2O_5$≤15 mol %.

In other embodiments, the glass consists essentially of or comprises from about 58 mol % to about 68 mol % $SiO_2$ (i.e., 58 mol %≤$SiO_2$≤68 mol %); from about 9 mol % to about 16 mol % $Al_2O_3$ (i.e., 9 mol %≤$Al_2O_3$≤16 mol %); from about 12 mol % to about 16 mol % $Na_2O$ (i.e., 12 mol %≤$Na_2O$≤16 mol %); $B_2O_3$; and $P_2O_5$, wherein 4 mol %≤$B_2O_3$ (mol %)+$P_2O_5$ (mol %)≤15 mol %.

Table 1 lists compositions and physical properties (densities, coefficients of thermal expansion (CTE), strain points, anneal points, softening points, Young's Modulus, molar volume, shear modulus, Poisson's ratio, stress optical coefficient (SOC), 35 kiloPoise temperature ($T^{35kP}$), and liquidus temperature ($T^L$) of glasses described herein that were made by the fusion draw process. Compositions were analyzed using x-ray fluorescence. Anneal, strain, and softening points were determined by fiber elongation. Density was determined by the buoyancy method, CTE is the average value between room temperature and 300° C., SOC was determined using the diametral compression method, and TL was determined by a 72 hour hold in a gradient boat.

TABLE 1

Compositions and physical properties of glasses made by the fusion draw process.

| Composition (mol %) | Glass 1 | Glass 2 | Glass 3 | Glass 4 | Glass 5 | Glass 6 |
|---|---|---|---|---|---|---|
| $SiO_2$ | 64.79 | 64.34 | 63.76 | 63.34 | 63.29 | 62.53 |
| $Al_2O_3$ | 13.95 | 14.04 | 14.16 | 14.32 | 14.42 | 14.68 |
| $Na_2O$ | 13.75 | 13.92 | 14.08 | 14.23 | 14.21 | 14.49 |
| $P_2O_5$ | 0.37 | 0.85 | 1.48 | 2.02 | 2.36 | 3.44 |
| $B_2O_3$ | 4.47 | 4.14 | 3.75 | 3.27 | 2.99 | 2.08 |
| MgO | 2.51 | 2.55 | 2.61 | 2.66 | 2.55 | 2.60 |
| Anneal Pt. (° C.): | 628 | 628 | 629 | 633 | 633 | 635 |
| Strain Pt. (° C.): | 574 | 574 | 576 | 579 | 580 | 582 |
| Softening Pt. (° C.): | 910 | 907.6 | 910 | 919 | 920.7 | 925.9 |
| Density (g/cm³): | 2.39 | 2.394 | 2.396 | 2.397 | 2.398 | 2.401 |
| CTE (×10⁻⁷/° C.): | 75.9 | 76.1 | 76.8 | 77.6 | 78.1 | 79 |
| Molar Volume (cm³/mol) | 27.8 | 27.94 | 28.14 | 28.32 | 28.44 | 28.78 |
| Young's modulus (Mpsi) | 9.889 | 9.807 | 9.889 | 9.725 | 9.686 | 9.658 |
| Shear modulus (Mpsi) | 4.058 | 4.026 | 4.009 | 3.997 | 3.997 | 3.996 |
| Poisson's ratio | 0.218 | 0.218 | 0.233 | 0.216 | 0.212 | 0.209 |
| SOC | 32.9 | 32.88 | 32.63 | 32.6 | 32.42 | 32.01 |
| $T^{35KP}$ (° C.) | 1212 | 1217 | 1220 | 1226 | 1222 | 1225 |
| SOC (nm/cm/MPa) | 32.93 | 32.88 | 32.63 | 32.6 | 32.42 | 32.01 |
| Liquidus T (° C.) | | 920 | | 945 | | 965 |

| Composition (mol %) | Glass 7 | Glass 8 | Glass 9 | Glass 10 | Glass 11 |
|---|---|---|---|---|---|
| $SiO_2$ | 61.99 | 61.50 | 61.04 | 60.78 | 60.08 |
| $Al_2O_3$ | 14.82 | 14.95 | 15.04 | 15.17 | 15.39 |

TABLE 1-continued

Compositions and physical properties of glasses made by the fusion draw process.

| | | | | | |
|---|---|---|---|---|---|
| Na$_2$O | 14.59 | 14.77 | 14.87 | 14.97 | 15.22 |
| P$_2$O$_5$ | 4.03 | 4.65 | 5.13 | 5.61 | 6.24 |
| B$_2$O$_3$ | 1.72 | 1.27 | 1.00 | 0.51 | 0.08 |
| MgO | 2.67 | 2.68 | 2.75 | 2.76 | 2.81 |
| Anneal Pt. (° C.): | 636 | 636 | 637 | 637 | 636 |
| Strain Pt. (° C.): | 584 | 584 | 584 | 585 | 584 |
| Softening Pt. (° C.): | 926.3 | 927.4 | 926.9 | 927.1 | 924.9 |
| Density (g/cm$^3$): | 2.402 | 2.403 | 2.404 | 2.406 | 2.407 |
| CTE (×10$^{-7}$/° C.): | 79.7 | 80.2 | 80.9 | 81.1 | 82 |
| Molar Volume (cm$^3$/mol) | 28.98 | 29.18 | 29.33 | 29.48 | 29.7 |
| Young's modulus (Mpsi) | 9.675 | 9.673 | | | 9.594 |
| Shear modulus (Mpsi) | 3.96 | 3.964 | | | 3.952 |
| Poisson's ratio | 0.222 | 0.22 | | | 0.214 |
| SOC | −3.94 | −3.816 | −3.633 | −3.516 | |
| T$^{35KP}$ (° C.) | 10281 | 9924 | 9413.8 | 9128.6 | |
| SOC (nm/cm/MPa) | 16.5 | 43.5 | 80 | 98.1 | |
| Liquidus T (° C.) | 31.63 | 31.1 | 31.2 | 31.2 | 31.2 |

Additional examples of glasses and selected physical properties prepared in a research melter are listed in Tables 2 and 2a. The compositions reported in Table 2 are as-batched compositions. Anneal, strain and softening points were determined by fiber elongation. Density was determined by Buoyancy Method, CTE is the average value between room temperature and 300° C., and the stress optic coefficient was determined using the diametral compression method.

TABLE 2

Compositions and physical properties of glasses made in a research melter.

| Composition (mol %) | Glass 12 | Glass 13 | Glass 14 | Glass 15 | Glass 16 | Glass 17 |
|---|---|---|---|---|---|---|
| SiO$_2$ | 60 | 62.6 | 65 | 69.9 | 64.4 | 64.8 |
| Al$_2$O$_3$ | 13.8 | 12.9 | 12 | 10.4 | 12.9 | 13 |
| B$_2$O$_3$ | 6.7 | 6.3 | 5.8 | 5 | 4.8 | 5 |
| Li$_2$O | | | | | | |
| Na$_2$O | 14.5 | 13.5 | 12.6 | 10.9 | 14.3 | 13.4 |
| K$_2$O | 0 | 0 | 0 | 0 | 0 | 0 |
| MgO | 1 | 0.9 | 0.9 | 0.8 | 0.7 | 0.8 |
| P$_2$O$_5$ | 4 | 3.7 | 3.5 | 3 | 2.9 | 3 |
| SnO$_2$ | 0.1 | 0.1 | 0.1 | 0.1 | 0.1 | 0.1 |
| Anneal Pt. (° C.) | 573 | 579 | 585 | 601 | 567 | 580 |
| Strain Pt. (° C.): | 523 | 526 | 531 | 541 | 516 | 526 |
| Softening Pt. (° C.): | 836 | 850 | 866 | 913 | 837 | 877 |
| Density (g/cm$^3$): | 2.371 | 2.363 | 2.354 | 2.333 | 2.37 | 2.353 |
| CTE (×10$^{-7}$/° C.): | 76.5 | 74.1 | 70.1 | 65 | 80 | 73.5 |

| Composition (mol %) | Glass 18 | Glass 19 | Glass 20 | Glass 21 | Glass 22 | Glass 23 |
|---|---|---|---|---|---|---|
| SiO$_2$ | 60 | 60 | 60 | 60 | 60 | 60 |
| Al$_2$O$_3$ | 13.8 | 13.8 | 13.8 | 13.8 | 13.8 | 13.8 |
| B$_2$O$_3$ | 8.7 | 7.7 | 5.7 | 4 | 2 | 0 |
| Li$_2$O | | | | 0 | 0 | 0 |
| Na$_2$O | 14.5 | 14.5 | 14.5 | 14.5 | 14.5 | 14.5 |
| K$_2$O | 0 | 0 | 0 | 0 | 0 | 0 |
| MgO | 1.0 | 1.0 | 1.0 | 1.0 | 1.0 | 1.0 |
| P$_2$O$_5$ | 2 | 3 | 5 | 6.7 | 8.7 | 10.7 |
| SnO$_2$ | 0.1 | 0.1 | 0.1 | 0.1 | 0.1 | 0.1 |
| Anneal Pt. (° C.) | 571 | 571 | 574 | 573 | 573 | 583 |
| Strain Pt. (° C.): | 522 | 521 | 523 | 521 | 521 | 530 |
| Softening Pt. (° C.): | 823 | 829 | 847 | 852 | 867 | 887 |
| Density (g/cm$^3$): | 2.372 | 2.373 | 2.371 | 2.372 | 2.371 | 2.372 |
| CTE (×10$^{-7}$/° C.): | 78 | 77 | 77 | 76 | 77 | 76 |

| Composition (mol %) | Glass 24 | Glass 25 | Glass 26 | Glass 27 | Glass 28 | Glass 29 |
|---|---|---|---|---|---|---|
| SiO$_2$ | 60 | 70.1 | 70.1 | 70.1 | 69.1 | 67.7 |
| Al$_2$O$_3$ | 13.8 | 10.0 | 10.0 | 10.0 | 10.0 | 10.7 |
| B$_2$O$_3$ | 6.7 | 8.3 | 6.3 | 4.3 | 7.3 | 6.9 |
| Li$_2$O | 0 | 0.0 | 0.0 | 0.0 | 0.0 | 0 |
| Na$_2$O | 14.5 | 11.2 | 11.2 | 11.2 | 10.2 | 9.6 |
| K$_2$O | 0 | 0.25 | 0.25 | 0.25 | 0.25 | 2.2 |

TABLE 2-continued

Compositions and physical properties of glasses made in a research melter.

| | | | | | | |
|---|---|---|---|---|---|---|
| MgO | 1.0 | 0.0 | 0.0 | 0.0 | 1.00 | 1 |
| P$_2$O$_5$ | 4 | 0 | 2 | 4 | 2 | 2 |
| SnO$_2$ | 0.1 | 0.05 | 0.05 | 0.05 | 0.05 | 0.05 |
| Anneal Pt. (° C.): | 568 | 612 | 584 | 586 | 583 | 576 |
| Strain Pt. (° C.): | 518 | 578 | 532 | 530 | 528 | 523 |
| Softening Pt. (° C.): | 852 | 827 | 862 | 883 | 881 | 873 |
| Density (g/cm$^3$): | 2.366 | 2.342 | 2.341 | 2.337 | 2.327 | 2.345 |
| CTE (×10$^{-7}$/° C.): | 74 | 67 | 66.4 | 65.6 | 63.9 | 70.1 |

| Composition (mol %) | Glass 30 | Glass 31 | Glass 32 | Glass 33 | Glass 34 | Glass 35 |
|---|---|---|---|---|---|---|
| SiO$_2$ | 70.1 | 65.7 | 65.7 | 65.7 | 65.7 | 65.7 |
| Al$_2$O$_3$ | 10.0 | 10.7 | 10.7 | 10.7 | 10.7 | 10.7 |
| B$_2$O$_3$ | 6.3 | 10.7 | 7.7 | 5.35 | 3 | 0 |
| Li$_2$O | 0.0 | 0 | 0 | 0 | 0 | 0 |
| Na$_2$O | 9.2 | 11.6 | 11.6 | 11.6 | 11.6 | 11.6 |
| K$_2$O | 2.2 | 1.3 | 1.3 | 1.3 | 1.3 | 1.3 |
| MgO | 0.0 | 0 | 0 | 0 | 0 | 0 |
| P$_2$O$_5$ | 2 | 0 | 3 | 5.35 | 7.7 | 10.7 |
| SnO$_2$ | 0.05 | 0.1 | 0.1 | 0.1 | 0.1 | 0.1 |
| Anneal Pt. (° C.): | 584 | 561 | 555 | 555 | 551 | |
| Strain Pt. (° C.): | 530 | 514 | 506 | 504 | 499 | |
| Softening Pt. (° C.): | 863 | 782 | 811 | 836 | 851 | |
| Density (g/cm$^3$): | 2.341 | 2.356 | 2.354 | 2.349 | 2.345 | 2.344 |
| CTE (×10$^{-7}$/° C.): | 69.1 | | | | | |

| Composition (mol %) | Glass 36 | Glass 37 | Glass 38 | Glass 39 | Glass 40 | Glass 41 |
|---|---|---|---|---|---|---|
| SiO$_2$ | 65.7 | 64.5 | 65.7 | 65.7 | 65.7 | 65.7 |
| Al$_2$O$_3$ | 10.7 | 10.7 | 10.7 | 10.7 | 11.2 | 11.2 |
| B$_2$O$_3$ | 4.35 | 5.5 | 5.7 | 5.2 | 6.7 | 6.7 |
| Li$_2$O | 0 | 0 | 0 | 0 | 0 | 0 |
| Na$_2$O | 11.6 | 11.6 | 11.6 | 11.6 | 11.6 | 11.1 |
| K$_2$O | 1.3 | 1.3 | 1.3 | 1.3 | 0.8 | 1.3 |
| MgO | 2 | 1.5 | 1 | 1.5 | 0 | 0 |
| P$_2$O$_5$ | 4.35 | 4 | 4 | 4 | 4 | 4 |
| SnO$_2$ | 0.1 | 0.1 | 0.1 | 0.1 | 0.1 | 0.1 |
| Anneal Pt. (° C.): | 581 | 567 | 566 | 577 | 571 | 569 |
| Strain Pt. (° C.): | 259 | 517 | 517 | 526 | 522 | 524 |
| Softening Pt. (° C.): | 886 | 827 | 824 | 841 | 821 | 791 |
| Density (g/cm$^3$): | 2.367 | 2.371 | 2.379 | 2.373 | 2.381 | 2.402 |
| CTE (×10$^{-7}$/° C.): | | 79 | 78 | 77 | 81 | 85 |
| SOC (nm/cm/MPa) | | 33.6 | 32.8 | 33.6 | 34.1 | 33 |

| Composition (mol %) | Glass 42 | Glass 43 | Glass 44 | Glass 45 | Glass 46 | Glass 47 |
|---|---|---|---|---|---|---|
| SiO$_2$ | 60 | 60 | 60 | 60 | 60 | 60 |
| Al$_2$O$_3$ | 13.8 | 13.8 | 13.8 | 13.8 | 12.8 | 12.3 |
| B$_2$O$_3$ | 9.7 | 8.7 | 8.7 | 7.7 | 8.7 | 8.2 |
| Li$_2$O | 0.5 | 0.5 | 0 | 0 | 0 | 0 |
| Na$_2$O | 14.5 | 14.5 | 14.5 | 14.5 | 14.5 | 14.5 |
| K$_2$O | 0.5 | 0.5 | 0 | 0 | 0 | 0 |
| MgO | 1 | 2 | 1 | 2 | 2 | 2 |
| P$_2$O$_5$ | 0 | 0 | 2 | 3 | 2 | 3 |
| SnO$_2$ | 0.1 | 0.1 | 0.1 | 0.1 | 0.1 | 0.1 |
| Anneal Pt. (° C.): | 559 | 566 | 571 | 570 | 564 | 560 |
| Strain Pt. (° C.): | 513 | 521 | 522 | 520 | 518 | 515 |
| Softening Pt. (° C.): | 784 | 793 | 825 | 824 | 810 | 806 |
| Density (g/cm$^3$): | 2.39 | 2.403 | 2.372 | 2.373 | 2.372 | 2.381 |
| CTE (×10$^{-7}$/° C.): | 81 | 80 | 77 | 77 | 78 | 78 |

| Composition (mol %) | Glass 48 | Glass 49 | Glass 50 | Glass 51 | Glass 52 | Glass 53 |
|---|---|---|---|---|---|---|
| SiO$_2$ | 60 | 60 | 60 | 60 | 60 | 60 |
| Al$_2$O$_3$ | 13.8 | 13.8 | 13.8 | 13.8 | 14.2 | 14.7 |
| B$_2$O$_3$ | 7.2 | 7.2 | 6.2 | 6.7 | 9.7 | 8.7 |
| Li$_2$O | 0.5 | 0 | 0.5 | 0 | 0.5 | 0.5 |
| Na$_2$O | 14.5 | 14.5 | 14.5 | 14.5 | 14.9 | 15.4 |
| K$_2$O | 0 | 0.5 | 0 | 0 | 0.5 | 0.5 |
| MgO | 0 | 0 | 1 | 1 | 0 | 0 |
| P$_2$O$_5$ | 4 | 4 | 4 | 4 | 0 | 0 |
| SnO$_2$ | 0.1 | 0.1 | 0.1 | 0.1 | 0.1 | 0.1 |
| Anneal Pt. (° C.): | 556 | 562 | 561 | 568 | 561 | |
| Strain Pt. (° C.): | 506 | 512 | 511 | 518 | 508 | |
| Softening Pt. (° C.): | 830 | 839 | 839 | 852 | 837 | 850 |
| Density (g/cm$^3$): | 2.357 | 2.363 | 2.36 | 2.366 | 2.343 | 2.344 |

TABLE 2-continued

Compositions and physical properties of glasses made in a research melter.

| | | | | | | |
|---|---|---|---|---|---|---|
| CTE (×10⁻⁷/° C.): | 74 | 73 | 74 | 74 | 71 | 72 |
| SOC (nm/cm/MPa) | 33.42 | 34.4 | 33.49 | 33.5 | 34.67 | 34.54 |

| Composition (mol %) | Glass 54 | Glass 55 | Glass 56 | Glass 57 | Glass 58 | Glass 59 | Glass 60 |
|---|---|---|---|---|---|---|---|
| $SiO_2$ | 57.36 | 58.41 | 58.57 | 58.64 | 57.15 | 56.95 | 57.14 |
| $Al_2O_3$ | 16.40 | 15.94 | 15.94 | 15.91 | 17.14 | 17.91 | 17.19 |
| $B_2O_3$ | 0.35 | 0.28 | 0.50 | 0.75 | 0.28 | 0.50 | 0.77 |
| $Li_2O$ | | | | | | | |
| $Na_2O$ | 16.22 | 15.79 | 15.71 | 15.72 | 16.97 | 17.03 | 16.92 |
| $K_2O$ | | | | | | | |
| MgO | 3.19 | 2.94 | 2.72 | 2.47 | 1.71 | 1.48 | 1.23 |
| $P_2O_5$ | 6.31 | 6.38 | 6.30 | 6.26 | 6.49 | 6.58 | 6.50 |
| $SnO_2$ | 0.05 | 0.05 | 0.05 | 0.05 | 0.05 | 0.05 | 0.05 |
| Anneal Pt. (° C.): | 605 | 596 | 591 | 581 | 598 | 593 | 588 |
| Strain Pt. (° C.): | 658 | 649 | 645 | 636 | 653 | 649 | 644 |
| Softening Pt. (° C.): | 928.1 | 930.1 | 926.7 | 924.6 | 932.4 | 932 | 926.7 |
| Density (g/cm³): | 2.423 | 2.416 | 2.413 | 2.41 | 2.419 | 2.416 | 2.413 |
| CTE (×10⁻⁷/° C.): | 84.3 | 82.6 | 81.9 | 82.2 | 85.7 | 86 | 85.8 |
| SOC (nm/cm/MPa) | 30.5 | 30.9 | 30.7 | 31.6 | 30.7 | 30.4 | 31.0 |

TABLE 2a

Compositions and physical properties of glasses made in a research melter.

| Composition (mol %) | 61 | 62 | 63 | 64 | 65 | 66 |
|---|---|---|---|---|---|---|
| $SiO_2$ | 58.10 | 58.90 | 60.08 | 61.33 | 59.34 | 59.06 |
| $Al_2O_3$ | 16.39 | 15.85 | 15.38 | 15.01 | 15.96 | 15.89 |
| $B_2O_3$ | 3.60 | 3.89 | 3.80 | 3.70 | 2.59 | 1.76 |
| $Na_2O$ | 16.58 | 16.08 | 15.47 | 14.74 | 15.89 | 16.02 |
| $K_2O$ | 0.03 | 0.03 | 0.03 | 0.03 | 0.04 | 0.05 |
| MgO | 2.53 | 2.52 | 2.51 | 2.51 | 2.51 | 2.51 |
| CaO | 0.04 | 0.04 | 0.04 | 0.04 | 0.04 | 0.04 |
| $P_2O_5$ | 2.63 | 2.58 | 2.58 | 2.52 | 3.53 | 4.56 |
| $SnO_2$ | 0.10 | 0.10 | 0.10 | 0.10 | 0.10 | 0.10 |
| Anneal Pt. (° C.): | 621 | 627 | 619 | 613 | 622 | 630 |
| Strain Pt. (° C.): | 571 | 573 | 567 | 562 | 569 | 577 |
| Softening Pt. (° C.): | 879 | 885.7 | 889.4 | 891.4 | 891 | 904 |
| Density (g/cm³): | 2.421 | 2.416 | 2.412 | 2.406 | 2.415 | 2.416 |
| CTE (×10⁻⁷/° C.): | 84.2 | 83.1 | 80.7 | 80.1 | 82.4 | 83 |
| Molar Volume (cm³/mol) | 28.65 | 28.61 | 28.57 | 28.55 | 28.91 | 29.20 |
| Young's modulus (Mpsi) | 9.998 | 9.845 | 10.017 | 9.852 | 9.641 | 9.65 |
| Shear modulus (Mpsi) | 3.919 | 3.878 | 3.896 | 3.888 | 3.902 | 3.903 |
| Poisson's ratio | 0.276 | 0.291 | 0.264 | 0.267 | 0.236 | 0.236 |

| Composition (mol %) | 67 | 68 | 69 | 70 | 71 | 72 |
|---|---|---|---|---|---|---|
| $SiO_2$ | 63.25 | 62.48 | 64.10 | 62.35 | 64.28 | 63.25 |
| $Al_2O_3$ | 14.61 | 14.65 | 14.07 | 14.63 | 14.64 | 14.62 |
| $B_2O_3$ | 3.10 | 2.91 | 3.25 | 3.06 | 3.28 | 2.23 |
| $Na_2O$ | 13.74 | 13.71 | 13.31 | 13.73 | 13.48 | 13.73 |
| $K_2O$ | 0.03 | 0.03 | 0.03 | 0.03 | 0.02 | 0.03 |
| MgO | 2.55 | 3.04 | 2.54 | 3.03 | 2.10 | 3.06 |
| CaO | 0.05 | 0.05 | 0.05 | 0.05 | 0.04 | 0.05 |
| $P_2O_5$ | 2.57 | 3.02 | 2.55 | 3.00 | 2.06 | 2.93 |
| $SnO_2$ | 0.10 | 0.10 | 0.10 | 0.09 | 0.10 | 0.10 |
| Anneal Pt. (° C.): | 647 | 637 | 635 | 630 | 654 | 655 |
| Strain Pt. (° C.): | 590 | 582 | 579 | 577 | 587 | 599 |
| Softening Pt. (° C.): | 928.8 | 918 | 928.5 | 914.3 | 934.7 | 939 |
| Density (g/cm³): | 2.397 | 2.401 | 2.393 | 2.401 | 2.395 | 2.405 |
| CTE (×10⁻⁷/° C.): | 74.7 | 75.7 | 73.5 | 75.7 | 74.9 | 75.6 |
| Molar Volume (cm³/mol) | 28.56 | 28.63 | 28.51 | 28.62 | 28.46 | 28.51 |
| Young's modulus (Mpsi) | 9.563 | 9.352 | 9.465 | 9.51 | 9.698 | 9.6 |
| Shear modulus (Mpsi) | 3.991 | 3.961 | 3.981 | 3.97 | 3.994 | 4.026 |
| Poisson's ratio | 0.198 | 0.181 | 0.189 | 0.198 | 0.214 | 0.192 |

Silica ($SiO_2$) serves as the primary glass-forming oxide in the glass compositions described herein. The concentration of $SiO_2$ should be sufficiently high in order to provide the glass with sufficiently high chemical durability suitable for touch screen applications. However, the melting temperature (i.e., the 200 poise temperature) of pure $SiO_2$ or high-$SiO_2$ glasses is too high, since defects such as fining bubbles may appear. Furthermore, compared to most oxides, $SiO_2$ decreases the compressive stress created by ion exchange. $SiO_2$ also adds free volume to the network structure of the glass, thereby increasing the amount of point contact deformation required to form strength limiting crack systems. In some embodiments, the glass comprises from about 54 mol % to about 71 mol % $SiO_2$. In other embodiments, glass comprises from about 58 mol % to about 68 mol % $SiO_2$ and, in still other embodiments, from about 60 mol % to about 70 mol % $SiO_2$.

Alumina ($Al_2O_3$) may also serve as a glass former in these glasses. Like $SiO_2$, alumina generally increases the viscosity of the melt. An increase in $Al_2O_3$ relative to the alkalis (i.e., alkali metals and their oxides) or alkaline earths (i.e., alkaline earth metals and their oxides) generally results in improved durability of the glass. The structural role of the aluminum ions depends on the glass composition. When the concentration of alkali metal oxides ($R_2O$) is equal to or greater than the concentration of alumina ($R_2O \geq Al_2O_3$), all aluminum is tetrahedrally coordinated. Alkali ions charge compensate $Al^{3+}$ ions, so the aluminum ions act as $Al^{4+}$ ions, which favor tetrahedral coordination. This is the case for some of the example glasses listed in Table 1. Alkali ions that are in excess of aluminum ions tend to form non-bridging oxygens. In the other example glasses listed in Table 1, the concentration of alkali metal oxides is less than the concentration of aluminum ions ($R_2O \leq Al_2O_3$). Here, divalent cation oxides (R'O) may also charge balance tetrahedral aluminum. While the behavior of calcium, strontium, and barium ions is equivalent to that of two alkali ions, magnesium and zinc ions do not fully charge balance aluminum in tetrahedral coordination due to their high field strength. This may result in the formation of five- and six-fold coordinated aluminum.

Generally, $Al_2O_3$ plays a role in ion-exchangeable glasses since it enables a strong network backbone (i.e., high strain point) while allowing for the relatively fast diffusivity of alkali ions. High $Al_2O_3$ concentrations, however, lower the liquidus viscosity of the glass. Thus, the $Al_2O_3$ concentration in the glass should be maintained within in a reasonable range. In some embodiments, the glass comprises from about 9 mol % to about 18 mol % $Al_2O_3$ and, in other embodiments, from about 9 mol % to about 16 mol % $Al_2O_3$. In still other embodiments, the glass comprises from about 10 mol % to about 16 mol % alumina.

In addition to $Na_2O$, the glass, in some embodiments, further comprises at least one additional alkali metal oxide (i.e., $Li_2O$, $K_2O$, $Rb_2O$, and/or $Cs_2O$). Alkali metal oxides aid in achieving low melting temperatures and low liquidus temperatures. However, the addition of alkali metal oxides dramatically increases the coefficient of thermal expansion (CTE) and lowers the chemical durability of the glass. In order to perform ion exchange, the presence of a small alkali metal oxide, such as $Li_2O$ and $Na_2O$, in the glass is required to exchange with larger alkali ions (e.g., $K^+$) in an ion exchange media such as, for example, a molten salt bath. Three types of ion exchange can generally be carried out: $Na^+$-for-$Li^+$ exchange; $K^+$-for-$Li^+$ exchange; and $K^+$-for-$Na^+$ exchange. $Na^+$-for-$Li^+$ exchange results in a deep depth of the surface compressive layer (DOL) but a low compressive stress (CS). $K^+$-for-$Li^+$ exchange results in a small depth of layer but a relatively large compressive stress, and $K^+$-for-$Na^+$ exchange results in an intermediate depth of layer and intermediate compressive stress. A sufficiently high concentration of the small alkali metal oxide in the glass is necessary to produce a large compressive stress, since compressive stress is proportional to the number of alkali ions that are exchanged out of the glass. Accordingly, in some embodiments, the glass comprises from about 9 mol % to about 18 mol % $Na_2O$ and, in other embodiments, from about 12 mol % to about 16 mol % $Na_2O$. The glass may, in some embodiments, further comprise up to about 2 mol % of the other alkali metal oxides. The presence of lithium oxide ($Li_2O$) in the glass tends to inhibit $K^+$-for-$Na^+$ ion exchange and manufacturability of the glass by methods such as fusion-draw or slot-draw. Accordingly, the glasses described herein, in some embodiments, comprise less than about 1 mol % $Li_2O$. In other embodiments, the glass is free or substantially free of $Li_2O$. Similarly, the presence of $K_2O$ in the glass tends to inhibit $K^+$-for-$Na^+$ ion exchange, and the amount of this alkali oxide in the glass should also be limited. In some embodiments, the glass contains less than about 2 mol % $K_2O$ and, in other embodiments, less than about 1 mol % $K_2O$.

Divalent cation oxides, such as the alkaline earth oxides and ZnO, improve the melting behavior of the glass. With respect to ion exchange performance, however, the presence of divalent cations tends to decrease alkali metal ion mobility. The negative effect on ion exchange performance is especially pronounced with the larger divalent cations, such as $Ba^{2+}$ and $Sr^{2+}$. Furthermore, the smaller divalent cation oxides (e.g., $Mg^{2+}$, $Zn^{2+}$, $Ca^{2+}$) generally promote compressive stress more than the larger divalent cations. Thus, MgO, ZnO, and, in some aspects, CaO offer several advantages with respect to improved stress relaxation while minimizing the adverse effects on alkali ion diffusivity. However, when the MgO and ZnO contents are too high, they are prone to form forsterite ($Mg_2SiO_4$) and gahnite ($ZnAl_2O_4$), or willemite ($Zn_2SiO_4$), thus causing the liquidus temperature to rise very steeply when the MgO and ZnO concentrations exceed a certain level. In some embodiments, the glasses described herein comprise at least one of MgO, Zn, O, CaO, BaO, and SrO, where 0.5 mol % ≤ MgO (mol %) + CaO (mol %) + ZnO (mol %) + BaO (mol %) + SrO (mol %) ≤ 4 mol %. In some embodiments, the glasses described herein comprise from 0 mol % to about 4 mol % MgO and, in other embodiments, from about 0.5 mol % to about 4 mol % MgO. Calcium and zinc oxide may be substituted for MgO. In certain embodiments, the glasses comprise up to about 4 mol % ZnO and, in other embodiments, from about 0.5 mol % to about 4 mol % ZnO. In some embodiments, the glass comprises MgO and ZnO, wherein 0.5 mol % ≤ MgO (mol %) + ZnO (mol %) ≤ 4 mol %. Similarly, the glass may, in some embodiments, may comprise up to about 4 mol % CaO, in other embodiments, from about 0.5 mol % to about 4 mol % CaO, and in still other embodiments, the glass comprises MgO and CaO, wherein 0.5 mol % ≤ MgO (mol %) + CaO (mol %) ≤ 4 mol %. In certain embodiments, the glasses are substantially free or free of at least one of CaO, BaO, and SrO.

The addition of $B_2O_3$ and $P_2O_5$ improves the damage resistance of these glasses. Boron is trigonally coordinated and thus opens up the structure when not charge balanced by alkali oxides or divalent cation oxides. The network around trigonally coordinated boron is not as rigid as that surrounding tetrahedrally coordinated boron; the bonds in trigonally coordinated boron are "floppy" and therefore allow the glass to tolerate some deformation before crack formation. Compared to higher coordination states, trigonal boron coordination also results in a greater amount of open space in the glass network. Furthermore, both boron and phosphorus decrease the melting viscosity and effectively help suppress zircon breakdown viscosity.

Figure 3:
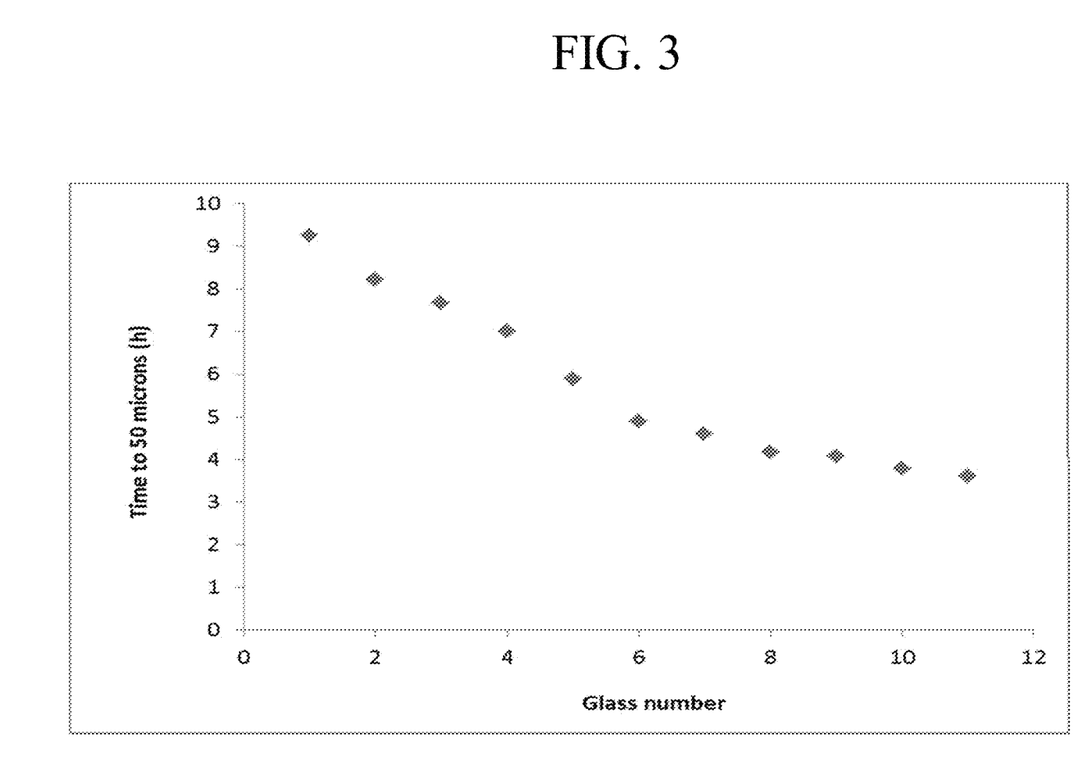
FIG. 3 is a plot of the time needed to ion exchange the glasses listed in Table 1 to a depth of layer of 50 μm.

Unlike $B_2O_3$, $P_2O_5$ improves diffusivity and decreases ion exchange times for the glass. However, some compressive stress capability is sacrificed by the structure formed by trigonally coordinated boron and phosphorus where the effect from $P_2O_5$ is also pronounced. FIG. 3, which is a plot of the time needed to ion exchange the glasses listed in Table 1 to a depth of layer of 50 μm, shows the effect of increased amounts of $P_2O_5$ on the rate of ion exchange.

In some embodiments, the glass comprises from about 0.5 mol % to about 11 mol % $B_2O_3$ and, in other embodiments, from about 2 mol % to about 10 mol % $B_2O_3$. In some embodiments, the amount of $Al_2O_3$ present in the glass is greater than, or greater than or equal to, the amount of $B_2O_3$ in the glass (i.e., $Al_2O_3$ (mol %)≥$B_2O_3$ (mol %)), and $Al_2O_3$ (mol %)≥$B_2O_3$ (mol %)+$P_2O_5$ (mol %). In some embodiments, the glass comprises from greater than 0 mol % to about 11 mol % $P_2O_5$ and, in other embodiments, from greater than 0 mol % to about 7 mol % $P_2O_5$, and, in still other embodiments, from greater than 0 mol % to about 4 mol % $P_2O_5$. In some embodiments, 4 mol %≤$B_2O_3$ (mol %)+$P_2O_5$ (mol %)≤15 mol %.

In some embodiments, the glasses described herein are ion exchanged using those means known in the art. In one non-limiting example, the glass is immersed in a molten salt bath containing an alkali metal cation such as, for example, $K^+$, which is larger than the $Na^+$ cation present in the glass. Means other than immersion in a molten salt bath may be used to ion exchange of the glass. Such means include, but are not limited to, the application of a paste or gel containing the cation to be introduced into the glass to at least one surface of the glass.

The ion exchanged glass has at least one surface layer that is under a compressive stress (CS), as schematically shown in FIG. 1. Glass 100 has a thickness t, first surface 110, and second surface 112. Glass 100, in some embodiments, has a thickness t of up to about 2 mm, in other embodiments, to about 1 mm, in other embodiments, up to 0.7 mm, in still other embodiments, up to about 0.5 mm. Glass 100 has a first layer 120 under a compressive stress ("compressive layer") extending from first surface 110 to a depth of layer $d_1$ into the bulk of the glass article 100. In the embodiment shown in FIG. 1, glass 100 also has a second compressive layer 122 under compressive stress extending from second surface 112 to a second depth of layer $d_2$. Glass 100 also has a central region 130 that extends from $d_1$ to $d_2$. Central region 130 is under a tensile stress or central tension, which balances or counteracts the compressive stresses of layers 120 and 122. The depths of layer $d_1$, $d_2$ of first and second compressive layers 120, 122 protect the glass 100 from the propagation of flaws introduced by sharp impact to first and second surfaces 110, 112 of glass 100, while the magnitude of the compressive stress in first and second compressive layers 120, 122 minimizes the likelihood of a flaw penetrating through the depth $d_1$, $d_2$ of first and second compressive layers 120, 122.

In some embodiments, the ion exchanged glass described herein has a compressive layer extending from a surface of the glass to a depth of layer of at least about 45 μm and, in certain embodiments, the depth of layer is at least about 50 microns (μm). The compressive layer(s) of the glass, in some embodiments, are under a compressive stress of at least about 900 MPa, and, in other embodiments, at least about 1 GPa when ion exchanged to a depth of layer of at least about 45 μm.

Figure 2:
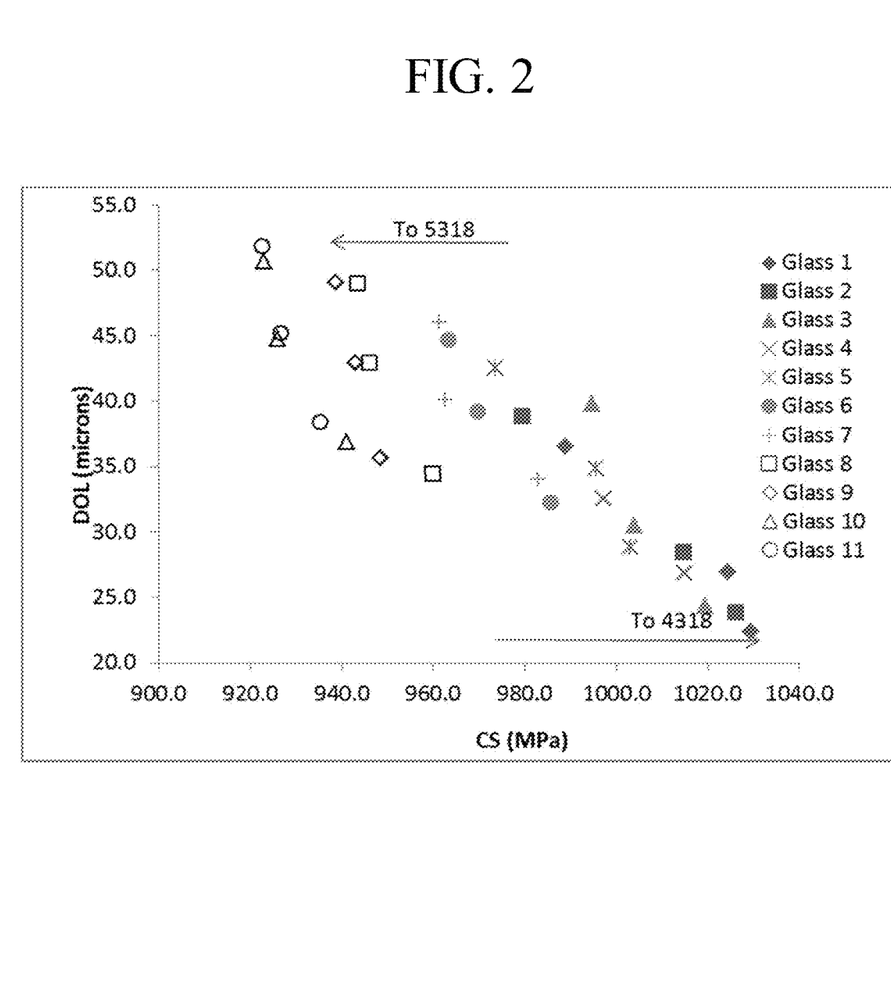
FIG. 2 is a plot of compressive stress and depth of layer for the ion exchanged glasses listed in Table 1.

Table 3 lists ion exchange properties (compressive stress, depth of layer) determined from FSM measurements of the ion exchanged glasses listed in Table 1. FIG. 2 is a plot of compressive stress and depth of layer for the ion exchanged glasses listed in Table 1. Ion exchange was carried out for the fusion drawn samples, each having a thickness of 1.3 mm, in a refined grade $KNO_3$ bath at 410° C. for 2 hours, 3 hours, 4 hours, 6 hours, 8 hours, and 12 hours. The CS and DOL values are average values, which have been corrected by assuming that SOC is 31 and the refractive index (RI) is 1.5. The compressive stresses of these glasses are generally greater than 900 MPa and, in some embodiments, greater than 1 GPa, as shown in FIG. 2. The rates of ion exchange of these glasses are significantly greater than those of alkali aluminosilicate glasses that do not contain phosphorus. In some embodiments, the glass is ion exchanged to achieve a depth of layer of at least 45 μm and a compressive stress of at least about 900 MPa in an ion exchange bath comprising or consisting essentially of $KNO_3$ at temperatures from about 410° C. to about 470° C. for up to about 5 hours, in some embodiments, for up to about 4 hours, and, in still other embodiments, for up to about 2 hours. FIG. 3 is a plot of the ion exchange time required, expressed in hours, to achieve a depth of layer of 50 μm for the glasses listed in Table 1. As can be seen from FIG. 3 and Table 1, the time required to ion exchange these glasses to a DOL of 50 μm decreases as the amount of $P_2O_5$ in the glass increases.

TABLE 3

Compressive stresses (CS) and depths of layer (DOL) for the glasses listed in Table 1 that were ion exchanged in a refined grade $KNO_3$ molten salt bath at 410° C. for times ranging from 2 to 8 hours.

| | Glass | | | | | |
|---|---|---|---|---|---|---|
| | 1 | 2 | 3 | 4 | 5 | 6 |
| CS (MPa) | 1013 | 1005 | 1001 | 991 | 979 | 969 |
| DOL (μm) | 22 | 24 | 24 | 27 | 29 | 32 |
| IX time (h) | 2 | 2 | 2 | 2 | 2 | 2 |
| CS (MPa) | 1008 | 994 | 985 | 974 | 972 | 954 |
| DOL (μm) | 27 | 28 | 31 | 33 | 35 | 39 |
| IX time (h) | 3 | 3 | 3 | 3 | 3 | 3 |
| CS (MPa) | 972 | 960 | | 970 | 955 | 950 |
| DOL (μm) | 37 | 39 | | 40 | 43 | 44 |
| IX time (h) | 4 | 4 | | 4 | 4 | 4 |
| CS (MPa) | 955 | 938 | 936 | 929 | 926 | 905 |
| DOL (μm) | 42 | 45 | 49 | 52 | 55 | 61.5 |
| IX time (h) | 8 | 8 | 8 | 8 | 8 | 8 |

| | Glass | | | | |
|---|---|---|---|---|---|
| | 7 | 8 | 9 | 10 | 11 |
| CS (MPa) | 972 | 960 | 940 | 926 | 914 |
| DOL (μm) | 34 | 34 | 36 | 37 | 38 |
| IX time (h) | 2 | 2 | 2 | 2 | 2 |
| CS (MPa) | 952 | 946 | 935 | 911 | 906 |
| DOL (μm) | 40 | 43 | 43 | 45 | 45 |
| IX time (h) | 3 | 3 | 3 | 3 | 3 |
| CS (MPa) | 950 | 944 | 930 | 910 | 901 |
| DOL (μm) | 46 | 49 | 49 | 50 | 52 |
| IX time (h) | 4 | 4 | 4 | 4 | 4 |
| OS (MPa) | 902 | 900 | 887 | 864 | 855 |
| DOL (μm) | 64 | 66 | 68 | 70 | 71 |
| IX time (h) | 8 | 8 | 8 | 8 | 8 |

Table 4 lists ion exchange properties for samples 12-53 listed in Table 2. Compressive stress and depth of layer were determined from FSM measurements. Annealed samples, each having a thickness of 1 mm, were ion exchanged at 470° C. for 2 hours in a molten salt bath containing refined grade $KNO_3$. The CS and DOL values in Table 4 are average values, which have been corrected by assuming that SOC is 31.8 and RI is 1.5.

TABLE 4

Ion exchange properties for samples 12-53 listed in Table 2.
The samples were annealed and ion exchanged at 470° C. for
2 hours in a molten salt bath containing refined grade KNO$_3$.

| | Glass | | | | | |
|---|---|---|---|---|---|---|
| | 12 | 13 | 14 | 15 | 16 | 17 |
| DOL (μm) | 50 | 49 | 48 | 49 | 60 | 60 |
| CS (MPa) | 526 | 508 | 505 | 476 | 480 | 454 |
| | Glass | | | | | |
| | 18 | 19 | 20 | 21 | 22 | 23 |
| DOL (μm) | 40 | 43 | 53 | 65 | 86 | 76 |
| CS (MPa) | 585 | 540 | 509 | 462 | 390 | 415 |
| | Glass | | | | | |
| | 24 | 25 | 26 | 27 | 28 | 29 |
| DOL (μm) | 47 | 30 | 42 | 54 | 39 | 50 |
| CS (MPa) | 434 | 500 | 433 | 373 | 411 | 420 |
| | Glass | | | | | |
| | 30 | 31 | 32 | 33 | 33 | 34 |
| DOL (μm) | 53 | 29 | 44 | 58 | 58 | 72 |
| CS (MPa) | 385 | 491 | 397 | 334 | 334 | 275 |
| | Glass | | | | | |
| | 35 | 36 | 37 | 38 | 39 | 40 |
| DOL (μm) | | 51 | 49 | 41 | 42 | |
| CS (MPa) | | 429 | 477 | 554 | 568 | |
| | Glass | | | | | |
| | 41 | 42 | 43 | 44 | 45 | 46 |
| DOL (μm) | | 27 | 26 | 35 | 38 | 33 |
| CS (MPa) | | 665 | 703 | 605 | 547 | 562 |
| | Glass | | | | | |
| | 47 | 48 | 49 | 50 | 51 | 52 | 53 |
| DOL (μm) | 36 | 45 | 45 | 48 | 47 | 46 | 47 |
| OS (MPa) | 513 | 431 | 441 | 442 | 457 | 412 | 404 |

Ion exchange properties for samples 54-60 in Table 2 are listed in Table 5. Compressive stress and depth of layer were determined from FSM measurements. Samples, each having a thickness of 1 mm, were ion exchanged at 420° C. for 2.5 hours in a molten salt bath containing refined grade KNO$_3$. The CS and DOL values in Table 5 are average values that have been corrected by assuming that SOC is 31.8 and RI is 1.5.

TABLE 5

Ion exchange properties for samples 54-60 in Table 2.
Samples, each having a thickness of 1 mm, were ion exchanged at
420° C. for 2.5 hours in a molten salt bath containing refined grade KNO$_3$.

| | Glass | | | | | | |
|---|---|---|---|---|---|---|---|
| | 54 | 55 | 56 | 57 | 58 | 59 | 60 |
| OS (MPa) | 942 | 913 | 894 | 852 | 930 | 926 | 916 |
| DOL (μm) | 51 | 50 | 52 | 50 | 54 | 55 | 54 |

Figure 4:
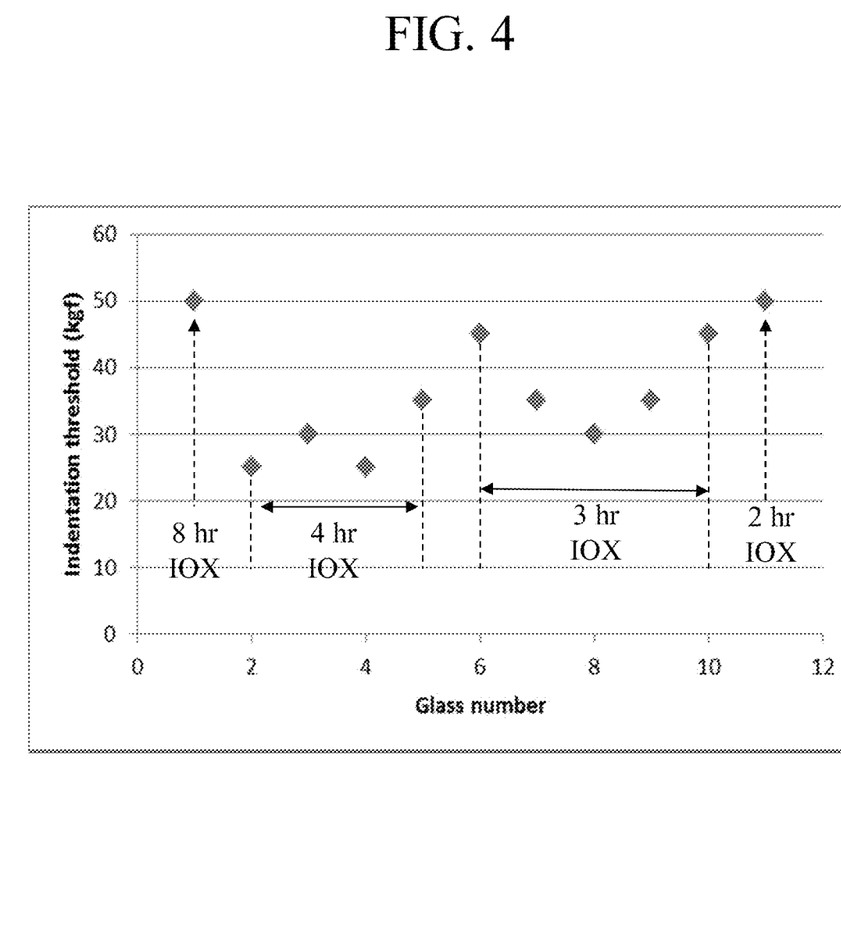
FIG. 4 is a plot Vickers crack indentation thresholds measured for samples 1-11 in Table 1.
Figure 5:
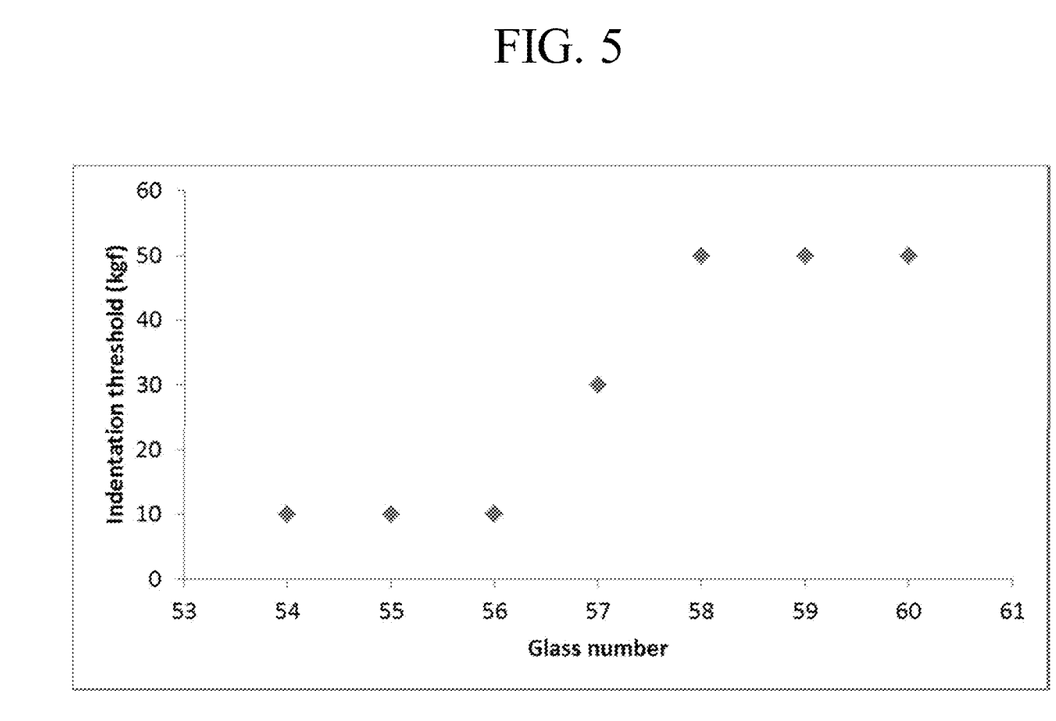
FIG. 5 is a plot of Vickers crack indentation thresholds measured for samples 54-60 in Table 2.

When ion exchanged as described herein above, the glasses described herein exhibit damage resistance that is comparable to or better than most alkali aluminosilicate glasses. This quality is at least partly attributable to the open structure resulting from the presence of B$_2$O$_3$ and P$_2$O$_5$ in the glass. These network formers—particularly B$_2$O$_3$—are trigonally coordinated and open up the glass structure. This may manifest itself in higher molar volume and lower density of the glass. The trigonally coordinated network is not as rigid as a tetrahedrally coordinated network, and is therefore more capable of tolerating more deformation before crack formation occurs. In some embodiments, the ion exchanged glass has a Vickers crack initiation threshold of at least about 10 kgf. In other embodiments the Vickers crack initiation threshold is at least about 15 kgf and, in other embodiments, at least about 20 kgf. Vickers crack indentation thresholds measured for samples 1-11 in Table 1 are plotted in FIG. 4. The samples were ion exchanged at 410° in a molten salt bath containing refined grade KNO$_3$ for times ranging from 2 hours to 8 hours. Sample 1 was ion exchanged for 8 hours, samples 2-5 were ion exchanged for 4 hours, samples 6-10 were ion exchanged for 3 hours, and sample 11 was ion exchanged for 2 hours. Compressive stresses and depths of layer that were obtained for these samples are listed in Table 3. Vickers crack indentation thresholds measured for samples 54-60 in Table 2 are plotted in FIG. 5. The samples were ion exchanged at 420° in a molten salt bath containing refined grade KNO$_3$ for 2.5 hours. Compressive stresses and depths of layer that were obtained for these samples are listed in Table 5.

In another aspect, a method of ion exchanging a glass is also provided. Method 600 includes a first step in which an ion exchange bath comprising or consisting essentially of KNO$_3$ is provided. The ion exchange bath may contain other salts such as, for example, NaNO$_3$, or may contain only or consist essentially of KNO$_3$. The ion exchange bathe is maintained at a temperature in a range from about 410° C. to 470° C. throughout the process. In a second step, a glass is then ion exchanged in the ion exchange bath for a time period of up to about four hours, after which time the ion exchanged glass has a layer under a compressive stress of at least about 900 MPa and, in some embodiments, at least 1 GPa. The layer extends from a surface of the glass to a depth of layer of at least about 45 μm and, in some embodiments, the depth of layer is at least about 50 μm. The glass that is ion exchanged in the method is a glass described hereinabove, comprising SiO$_2$, Al$_2$O$_3$, Na$_2$O, at least one divalent metal oxide, B$_2$O$_3$, and P$_2$O$_5$, wherein Al$_2$O$_3$ (mol %)≥B$_2$O$_3$ (mol %)+P$_2$O$_5$ (mol %).

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed:
1. A glass, comprising:
from 54 mol % to 71 mol % SiO$_2$;
from 9 mol % to 18 mol % Al$_2$O$_3$;
from 0.5 mol % to 11 mol % B$_2$O$_3$;
Na$_2$O;
from greater than 0 mol % to less than 2 mol % K$_2$O;
Li$_2$O;
MgO;
CaO;
SrO; and
from greater than 0 mol % to 11 mol % P$_2$O$_5$, wherein 0.5 mol % ≤ MgO(mol %)+CaO(mol %)+ZnO(mol %)+BaO(mol %)+SrO(mol %) ≤ 4 mol %, and Al$_2$O$_3$(mol %) ≥ B$_2$O$_3$(mol %)+P$_2$O$_5$(mol %), 4 mol % ≤ B$_2$O$_3$(mol %)+P$_2$O$_5$(mol %) ≤ 15 mol %, wherein R$_2$O(mol %) ≤ Al$_2$O$_3$(mol %), where R$_2$O=Li$_2$O+Na$_2$O+K$_2$O+Rb$_2$O.

2. The glass of claim 1, wherein the glass comprises from greater than 0 mol % to 18 mol % Na$_2$O.

3. The glass of claim 1, wherein the glass comprises from 0.5 mol % up to 4 mol % MgO.

4. The glass of claim 1, further comprising up to 1 mol % SnO$_2$.

5. The glass of claim 1, comprising from 0.5 mol % to 11 mol % P$_2$O$_5$.

6. The glass of claim 1, wherein the glass comprises:
   from 58 mol % to 68 mol % SiO$_2$; and
   from 9 mol % to 16 mol % Al$_2$O$_3$.

7. The glass of claim 1, wherein the glass comprises MgO and ZnO, and wherein 0.5 mol % MgO(mol %)+ZnO(mol %) ≤ 4 mol %.

8. The glass of claim 1, wherein the glass, when ion exchanged in an ion exchange bath comprising KNO$_3$ at a temperature in a range from 410° C. to 470° C. for a time in a range from 2 hours to 5 hours, has a Vickers crack initiation threshold of at least 10 kgf.

9. An ion exchanged glass, wherein the ion exchanged glass has a compressive layer having a compressive stress extending from a surface of the glass to a depth of layer of at least 45 μm, and wherein the ion exchanged glass is formed from the glass of claim 1.

10. The ion exchanged glass of claim 9, wherein the compressive layer has a compressive stress of at least 900 MPa.

11. The ion exchanged glass of claim 9, wherein the compressive layer has a compressive stress of at least 1 GPa.

12. The ion exchanged glass of claim 9, wherein the ion exchanged glass has a Vickers crack initiation threshold of at least 10 kgf.

13. A method of ion exchanging a glass, the method comprising:
   a. providing an ion exchange bath, wherein the ion exchange bath comprises KNO$_3$ and is at a temperature in a range from 410° C. to 470° C.; and
   b. ion exchanging a glass in the ion exchange bath for a time period of up to 4 hours, wherein the ion exchanged glass has a layer under a compressive stress, the layer extending from a surface of the glass to a depth of layer of at least 45 μm, and the glass comprising:
   from 54 mol % to 71 mol % SiO$_2$;
   from 9 mol % to 18 mol % Al$_2$O$_3$;
   from 0.5 mol % to 11 mol % B$_2$O$_3$;
   Na$_2$O;
   from greater than 0 mol % to less than 2 mol % K$_2$O;
   Li$_2$O;
   MgO;
   CaO;
   SrO; and
   from greater than 0 mol % to 11 mol % P$_2$O$_5$,
   wherein 0.5 mol % ≤ MgO(mol %)+CaO(mol %)+ZnO(mol %)+BaO(mol %)+SrO(mol %) ≤ 4 mol %, and Al$_2$O$_3$(mol %) ≥ B$_2$O$_3$(mol %)+P$_2$O$_5$(mol %), 4 mol % ≤ B$_2$O$_3$(mol %)+P$_2$O$_5$(mol %) ≤ 15 mol %, wherein R$_2$O(mol %) ≤ Al$_2$O$_3$(mol %), where R$_2$O=Li$_2$O+Na$_2$O+K$_2$O+Rb$_2$O.

14. The method of claim 13, wherein the wherein the ion exchanged glass has a compressive stress of at least 900 MPa.

15. The method of claim 13, wherein the ion exchanged glass has a Vickers crack initiation threshold of at least 10 kgf.

16. An electronic device, comprising:
   a display;
   a protective cover disposed over the display,
   wherein the protective cover comprises the glass of claim 1.

17. An electronic device, comprising:
   a display;
   a protective cover disposed over the display,
   wherein the protective cover comprises the ion exchanged glass of claim 9.

* * * * *

UNITED STATES PATENT AND TRADEMARK OFFICE
CERTIFICATE OF CORRECTION

PATENT NO. : 11,352,289 B2
APPLICATION NO. : 16/983279
DATED : June 7, 2022
INVENTOR(S) : Matthew John Dejneka et al.

It is certified that error appears in the above-identified patent and that said Letters Patent is hereby corrected as shown below:

In the Claims

In Column 17, Line 21, in Claim 7, delete "mol % MgO" and insert -- mol %≤MgO --.

In Column 18, Line 26 (approx.), in Claim 14, delete "wherein the wherein the" and insert -- wherein the --.

Signed and Sealed this
Third Day of January, 2023

*Katherine Kelly Vidal*

Katherine Kelly Vidal
*Director of the United States Patent and Trademark Office*